United States Patent [19]

Newkirk

[11] 3,920,546

[45] Nov. 18, 1975

[54] N,N,N,N,N,N HEXAALKYL-BETA-HYDROXYTRIMETHYLENE DIAMMONIUM DIHALIDES

[75] Inventor: John D. Newkirk, Downers Grove, Ill.

[73] Assignee: Nalco Chemical Company, Chicago, Ill.

[22] Filed: Nov. 29, 1973

[21] Appl. No.: 420,153

[52] U.S. Cl. .................................................. 210/54
[51] Int. Cl. ............................................ B01d 21/01
[58] Field of Search .............................. 210/52–54; 260/2 BP, 567.6 P

[56] References Cited
UNITED STATES PATENTS

| | | | |
|---|---|---|---|
| 2,941,004 | 6/1960 | Pinson et al. | 260/567.6 P |
| 3,663,461 | 5/1972 | Witt | 210/54 |
| 3,725,312 | 4/1973 | Panzer et al. | 210/54 |
| 3,738,945 | 6/1973 | Panzer et al. | 260/2 BP |
| 3,755,160 | 8/1973 | Witt | 210/54 |

*Primary Examiner*—Charles N. Hart
*Assistant Examiner*—Peter A. Hruskoci
*Attorney, Agent, or Firm*—Kinzer, Plyer, Dorn & McEachran

[57] ABSTRACT

Novel 1, 3 bis-quaternary ammonium compounds are used as flocculants in water treatments and coagulants in sewage and waste stream applications.

3 Claims, No Drawings

N,N,N,N,N,N HEXAALKYL-BETA-HYDROXYTRIMETHYLENE DIAMMONIUM DIHALIDES

BACKGROUND OF THE INVENTION

This invention relates generally to novel bis-quaternary ammonium compounds and more particularly concerns compositions of matter which are useful for water and sewage treatment.

SUMMARY OF THE INVENTION

In accordance with the invention, it has been found that certain N,N,N,N',N',N' hexaalkyl-$\beta$-hydroxy-trimethylene diammonium dihalides are useful in water treatment. In particular these are compositions of matter with the formula:

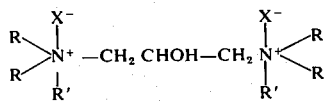

wherein R is selected from the group consisting of alkyl radicals with from 1 to 4 carbon atoms, R' is selected from the group consisting of alkyl radicals with from 1 to 3 carbon atoms, and X is selected from the group consisting of chlorine, bromine and iodine.

DETAILED DESCRIPTION OF THE INVENTION

The novel compositions of matter of the present invention are conveniently prepared by reacting epichlorohydrin with secondary amines and then alkylating the product. Thus, a typical reaction sequence would be

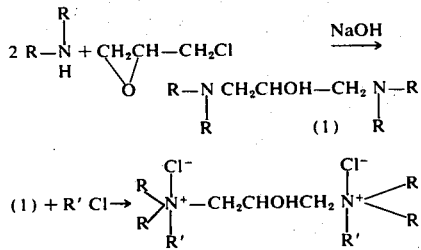

Where
$R = CH_3, C_4H_9,$
$R' = CH_3, CH_2=CH-CH_2,$ etc.

While the invention will be described in connection with a few examples it will be understood that it is not intended to limit the invention to those examples. On the contrary it is intended to cover all alternatives, modifications and equivalents may be included within the spirit and scope of the invention as defined by the appended claims.

EXAMPLE 1

Preparation of N,N,N,N',N',N' hexamethyl-$\beta$-hydroxytrimethylene diammonium dibromide.

Dimethyl amine and epichlorohydrin were mixed together in a ratio of two moles to one mole under basic conditions to provide N,N,N',N' tetramethyl-$\beta$-hydroxytrimethylene diamine which will be referred to as A. 146 grams of A was added to 200 grams of methanol. 220 grams, approximately a 20% molar excess, of methyl bromide was added to the solution. The reaction was quite exothermic and was cooled using a dry ice reflux condenser. The temperature was maintained at 45°C. or below overnight. Removal of the methanol by flash evaporation gave colorless crystals. The product was obtained in essentially quantitative yield of a deliquescent crystal. The crystals were dissolved 20% by weight in water for storage and transfer.

EXAMPLE 2

Preparation of N,N,N',N' tetrabutyl-N,N' dimethyl-$\beta$-hydroxytrimethylene diammonium dibromide.

Two moles of dibutyl amine and one mole of epichlorohydrin were reacted under basic conditions to give N,N,N',N' tetrabutyl-$\beta$-hydroxytrimethylene diamine which will be referred to as B. 146 grams of B was added to 400 grams of methanol. To this mixture 220 grams, approximately a 15% molar excess, of methyl bromide was added. The temperature was maintained at 45° C. or less overnight to give a quantitative yield of N,N,N',N' tetrabutyl-N,N' dimethyl-$\beta$-hydroxytrimethylene diammonium dibromide. A 20% by weight solution in water was prepared.

EXAMPLE 3

Use in water treatment.

A standard Kaolin Test, established as an acceptable simulation of waste water containing solid matter to be separated, was run with deionized water using the compounds of Examples 1 and 2. Use of 30 ppm active, without chlorine, of each compound showed activity for obtaining a residual turbidity of 10 FTU (Formazin Turbidity Units) deemed an acceptable turbidity level in some instances.

I claim:

1. A method of flocculating water containing entrained inorganic solids comprising treating said water with an effective amount of a water solution of:

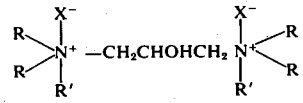

wherein,
R is selected from the group consisting of alkyl radicals with from 1 to 4 carbon atoms,
R' is selected from the group consisting of alkyl radicals with from 1 to 3 carbon atoms, and
X is selected from the group consisting of chlorine, bromine and iodine.

2. A method as in claim 1 wherein said water is treated with a water solution of N,N,N,N',N',N' hexamethyl-$\beta$-hydroxytrimethylene diammonium dibromide.

3. A method as in claim 1 wherein said water is treated with a water solution of N,N,N',N'-tetrabutyl-N,N' dimethyl-$\beta$-hydroxytrimethylene diammonium dibromide.

* * * * *